United States Patent
Kanamarlapudi et al.

(10) Patent No.: US 9,398,546 B2
(45) Date of Patent: Jul. 19, 2016

(54) CALL SUSTAINABILITY DURING POWER IMBALANCE IN MULTICARRIER UPLINK

(71) Applicant: QUALCOMM Incorporated, San Diego, CA (US)

(72) Inventors: Sitaramanjaneyulu Kanamarlapudi, San Diego, CA (US); Chetan Gopalakrishnan Chakravarthy, San Diego, CA (US); Liangchi Hsu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/790,819

(22) Filed: Jul. 2, 2015

(65) Prior Publication Data

US 2016/0183200 A1    Jun. 23, 2016

Related U.S. Application Data (60) Provisional application No. 62/094,896, filed on Dec. 19, 2014.

(51) Int. Cl.
*H04W 52/34* (2009.01)
*H04W 72/04* (2009.01)

(52) U.S. Cl.
CPC .......... *H04W 52/34* (2013.01); *H04W 72/0406* (2013.01); *H04W 72/0473* (2013.01)

(58) Field of Classification Search
CPC ................. H04W 52/04–52/60; H04W 72/04; H04W 72/0406; H04W 72/0473
USPC ........................................ 455/522; 370/318
See application file for complete search history.

(56) References Cited

U.S. PATENT DOCUMENTS

| | | | |
|---|---|---|---|
| 2011/0081936 A1 | 4/2011 | Haim et al. | |
| 2012/0008563 A1* | 1/2012 | Johansson | H04W 52/36 370/328 |

FOREIGN PATENT DOCUMENTS

EP    2306779 A1    4/2011

OTHER PUBLICATIONS

3GPP TS 25.321 V12.1.0 (Sep. 2014) $3^{rd}$ Generation Partnership Project; Technical Specification Group Radio Access Network; Medium Access Control (MAC) protocol specification (Release 12), 212 pp.

(Continued)

*Primary Examiner* — Raymond Dean
(74) *Attorney, Agent, or Firm* — Arent Fox LLP (57) ABSTRACT

In aspects for controlling transmit power of dual carrier uplink transmission for wireless communications, a user equipment (UE) determines presence of transmit power imbalance between a first and second radio frequency (RF) carrier of respective dedicated physical control channels for uplink transmission. The UE determines an estimate of a remaining available transmit power after estimating the transmit power used by each of the dedicated physical control channels. The UE allocates the estimated remaining available transmit power to the first and second RF carrier respectively based on both a size of data granted for uplink transmission on each RF carrier and on an effective power per bit on each RF carrier. Additionally, the UE determines a higher reliability value for each RF carrier based on a lower data error rate, identifies priority values for data to be transmitted and sends higher priority data over the RF carrier with higher reliability value.

9 Claims, 5 Drawing Sheets

(56) References Cited

OTHER PUBLICATIONS

Nokia Siemens Networks et al., "E-TFC selection for DC-HSUPA," 3GPP Draft; R2-093101, 3rd Generation Partnership Project (3GPP), Mobile Competence Centre; 650, Route Des Lucioles; F-06921 Sophia-Antipolis Cedex; France, no. San Francisco, USA; 20090428, Apr. 28, 2009, XP050340843, [retrieved on Apr. 28, 2009].

Partial International Search Report—PCT/US2015/063819—ISA/EPO—Mar. 7, 2016. 7 Total Pages.

* cited by examiner

CALL SUSTAINABILITY DURING POWER IMBALANCE IN MULTICARRIER UPLINK

CLAIM OF PRIORITY UNDER 35 U.S.C. §119

The present Application for Patent claims priority to Provisional Application No. 62/094,896 entitled "CALL SUSTAINABILITY DURING POWER IMBALANCE IN MULTICARRIER UPLINK" filed Dec. 19, 2014, which is assigned to the assignee hereof and hereby expressly incorporated in its entirety by reference herein.

BACKGROUND

Aspects of the present disclosure relate generally to wireless communication systems, and more particularly, to power control for multicarrier uplink transmission.

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Mobile Telecommunications System (UMTS) Terrestrial Radio Access Network (UTRAN). UTRAN is a radio access network (RAN) defined as a part of UMTS, a third generation (3G) mobile phone technology supported by the 3rd Generation Partnership Project (3GPP). UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). UMTS also supports enhanced 3G data communications protocols, such as High Speed Packet Access (HSPA) and High Speed Uplink Packet Access (HSUPA), which provide higher data transfer speeds and capacity to associated UMTS networks.

Figure 2A:
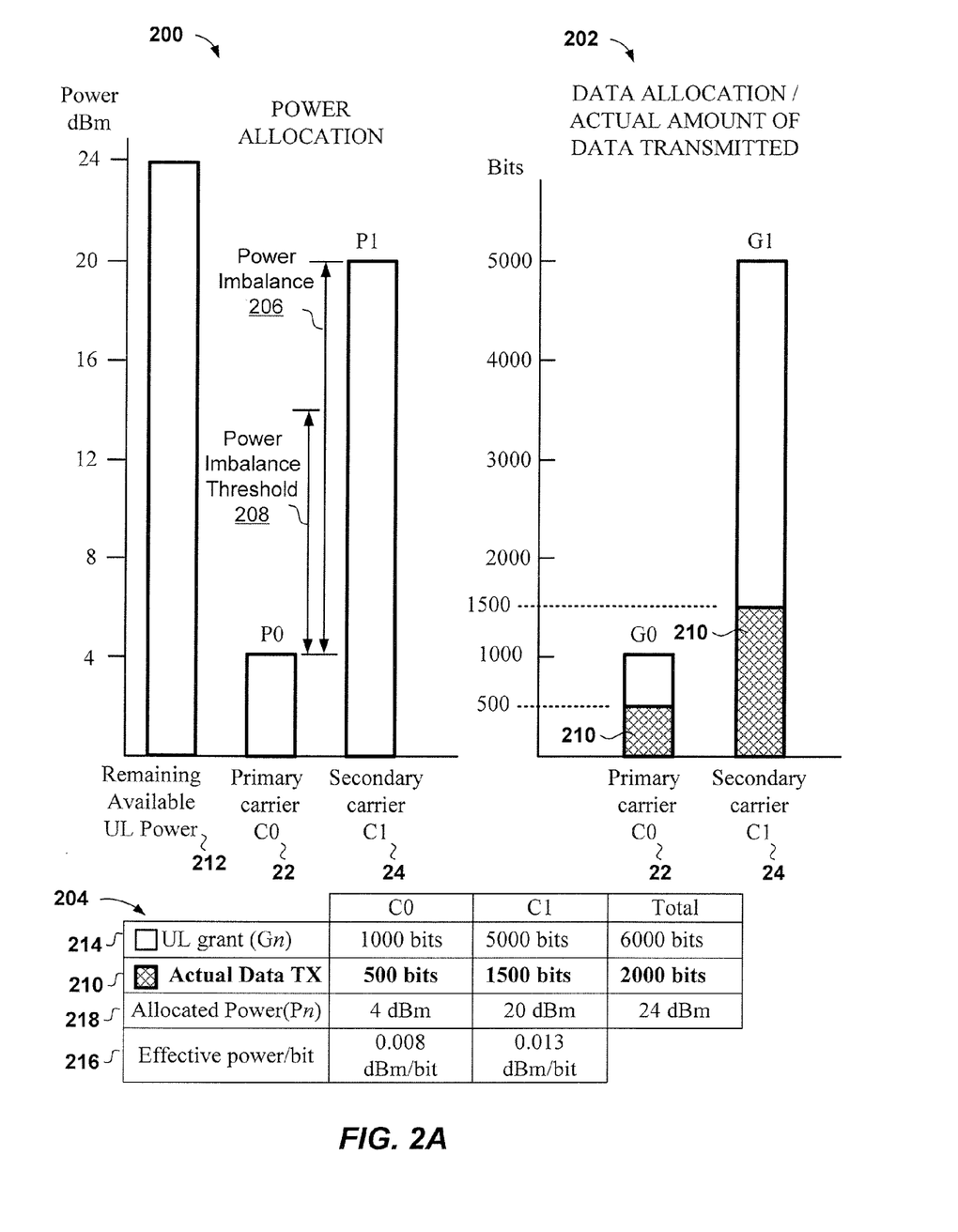
FIG. 2A is a graphical and summary table illustration of an initial power allocation, and corresponding data allocation and an actual amount of data transmitted, for each of two RF carriers where the initial power allocation is in proportion to the respective uplink data grant on each carrier.

In HSUPA systems, a user equipment (UE) may transmit uplink physical channels over multiple carriers that may include a dedicated physical control channel (DPCCH) or enhanced DPCCH (E-DPCCH). When the UE has more than one activated uplink carrier, also referred to as an activated uplink frequency, the UE estimates the remaining power that is available to be allocated to scheduled enhanced dedicated channel (E-DCH) transmissions by taking into account the DPCCH/E-DPCCH for each carrier. In particular, the UE may perform an E-DCH transport format combination (E-TFC) selection procedure that is first applied to a Secondary Uplink Frequency and then to a Primary Uplink Frequency. In observing different field scenarios, however, it has been noticed that different schedulers and different power management techniques at the network level affect the effective UE performance. For instance, if there is any imbalance between the multiple uplink carriers, effective data transmission as well as reliability of the data transmission might be degraded. For example, a UE may have a significant power imbalance (perhaps more than 5 dB) between the first carrier C0 (e.g., Primary Uplink Frequency) and the second carrier C1 (e.g., Secondary Uplink Frequency), due to strong interference on C1 such that it takes significantly more power (perhaps more than twice the power) to send data on carrier C1 than on carrier C0. As an example and as illustrated in FIG. 2A (which is described later in detail), a UE may have an allowed maximum power of 24 dBm 212, based on an uplink data grant 214 of 1000 bits on carrier C0 and 5000 bits on carrier C1. Power splitting for the carriers C0 and C1 may be proportionally allocated based on the data grant, where power P0 to carrier C0 is (1000/6000)24=4 dBm, and power P1 to carrier C1 is (5000/6000)24=20 dBm. However, due to the significant power imbalance and poor reliability of carrier C1, an E-TFCI assignment to the UE (e.g., the predefined maximum allowable throughput based on reliability of the channel) for the data transmission on carrier C1 is severely limited to only 1500 bits of the allocated 5000 bits. Otherwise, if carrier C1 was not impeded by interference, the E-TFCI selection could allot significantly more data bits. Meanwhile, the stronger carrier C0 may be limited to sending only 500 bits of the allocated 1000 bits based on E-TFCI for 4 dBm, which was due to the low power split based on the proportional grant. As such, current techniques may not maximize an amount of data that can be transmitted.

An additional issue with current 3GPP specifications relating to dual carrier HSUPA (DC-HSUPA) operation is that data to be transmitted is first sent on the second carrier (e.g., the Secondary Uplink Frequency) and then on the first carrier (e.g., the Primary Uplink Frequency). Accordingly, high priority data, which is selected to be sent first, is to be transmitted on the second carrier. In a case where an inferior carrier C1 is the second carrier, however, this high priority data is at risk of transmission failure due to the currently specified procedures.

Thus, improvements in transmitting uplink physical channels over multiple carriers are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the disclosure provides for controlling transmit power over multiple uplink carriers under conditions of a power imbalance, based on size of data in the uplink grant, in wireless communications. For instance, this disclosure provides for determining presence of a transmit power imbalance between a first radio frequency (RF) carrier and a second RF carrier of respective dedicated physical control channels for uplink transmission, determining an estimate of a remaining available transmit power after estimating the transmit power used by each of the dedicated physical control channels; and in response to determining the presence of the transmit power imbalance, the estimated remaining available transmit power to the first RF carrier and the second RF carrier respectively based on both a size of data granted for uplink transmission on each RF carrier and on an effective power per bit on each RF carrier.

In another aspect, this disclosure provides for scheduling higher priority data over a more reliable one of multiple uplink carriers. For instance, this disclosure provides for determining presence of a power imbalance between a first radio frequency (RF) carrier and a second RF carrier of respective dedicated physical control channels for uplink transmission, determining a reliability value for each RF carrier based on a data error rate, wherein a higher reliability value corresponds with a lower data error rate, identifying data to be transmitted as having a first priority value or second priority value, wherein data with the priority value has a higher priority than data with the second priority value; and sending high priority data to the RF carrier with a higher reliability value.

In other aspects, the disclosure provides for apparatuses and computer readable medium storing computer executable code for performing the above methods.

These and other aspects of the disclosure will become more fully understood upon a review of the detailed description, which follows.

BRIEF DESCRIPTION OF THE DRAWINGS

The accompanying drawings are presented to aid in the description of various aspects of the disclosure and are provided solely for illustration of the aspects and not limitation thereof. The drawings include like reference numbers for like elements, and may represent optional components or actions using dashed lines.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures may be shown in block diagram form in order to avoid obscuring such concepts. In an aspect, the term "function" as used herein may be one of the parts that make up a system, may be hardware, firmware, and/or software, and may be divided into other functions.

The present disclosure provides for user equipment (UE) management of uplink carrier transmit power allocation and data routing for multiple uplink RF carriers in the presence of a transmit power imbalance between at least two of the RF uplink carriers. In the case of dual carrier transmission, the chance of having one good carrier is quite high even when the other carrier is in bad condition. In one aspect, the present disclosure includes dividing transmission power to the multiple RF carriers based on both the amount of data granted to each carrier by the network and on the effective power per bit of each carrier, when a detected power imbalance exists among RF carriers. Further, in another aspect, for uplink transmissions having high priority data, an RF carrier having higher reliability is selected to transmit the high priority data upon detection of the power imbalance among the RF carriers.

Figure 1:
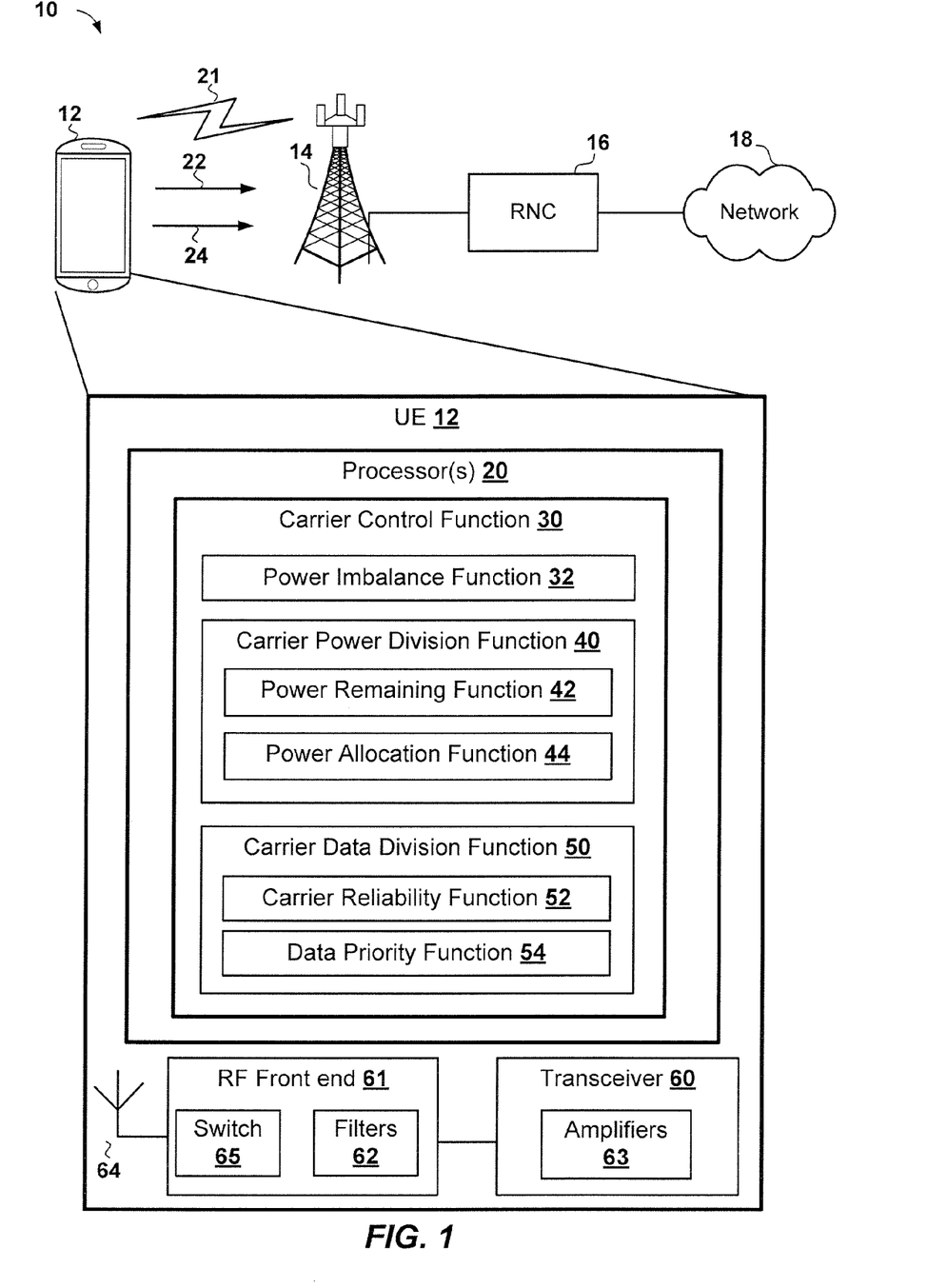
FIG. 1 is a block diagram illustrating an example communications network including a network entity, such as a base station, in communication with a user equipment (UE) configured for management of uplink carrier transmit power allocation and data routing for multiple RF carriers in the presence of a transmit power imbalance between at least two of the RF carriers.

Referring to FIG. 1, in an aspect, a wireless communication system 10 includes at least one UE 12 in the communication coverage of at least one network entity 14 (e.g., base station or Node B). In an aspect, the network entity 14 may be a base station or Node B in an UMTS network. UE 12 may communicate with a network 18 via network entity 14 and a radio network controller (RNC) 16. In some aspects, multiple UEs including UE 12 may be in communication coverage with one or more network entities, including network entity 14. In an example, UE 12 may transmit and/or receive wireless communications 21 to and/or from network entity 14.

In some aspects, UE 12 may also be referred to by those skilled in the art (as well as interchangeably herein) as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. A UE 12 may be a cellular phone, a personal digital assistant (PDA), a wireless modem, a wireless communication device, a handheld device, a tablet computer, a laptop computer, a cordless phone, a wireless local loop (WLL) station, a global positioning system (GPS) device, a multimedia device, a video device, a digital audio player (e.g., MP3 player), a camera, a game console, a wearable computing device (e.g., a smart-watch, smart-glasses, a health or fitness tracker, etc), an appliance, a sensor, a vehicle communication system, a medical device, a vending machine, a device for the Internet-of-Things, or any other similar functioning device. Additionally, network entity 14 may be a macrocell, picocell, femtocell, relay, Node B, mobile Node B, UE (e.g., communicating in peer-to-peer or ad-hoc mode with UE 12), or substantially any type of component that can communicate with UE 12 to provide wireless network access at the UE 12.

According to the present aspects, the UE 12 may include one or more processors 20 for executing various functions for controlling transmit power over multiple uplink RF carriers under conditions of a power imbalance as described herein. For instance, in some aspects, the various functions related to controlling transmit power over multiple uplink RF carriers may be executed by a single processor, while in other aspects different ones of the functions may be executed by a combination of two or more different processors. For example, in an aspect, the one or more processors 20 may include any one or any combination of a modem processor, or a baseband processor, or a digital signal processor, or a transmit processor, or a transceiver processor. In particular, the one or more processors 20 may execute carrier control function 30 configured to control transmit power on uplink RF carriers 22, 24 based on the presence of a transmit power imbalance between the at least two uplink RF carriers 22, 24. In an aspect, the carrier control function 30 may include hardware and/or software code executable by processor 20 for controlling carrier data routing of an uplink control channel in the presence of a transmit power imbalance between at least two uplink RF carriers. In an aspect, the term "function" as used herein may be one of hardware, firmware, and/or software, and may be divided into other functions.

In an aspect, for example, the carrier control function 30 may be implemented to include, be in communication with, or control, one or more subfunctions. Although illustrated as being a part of carrier control function 30, it should be understood that the subfunctions discussed herein may be implemented independently on the same or on a different processor. For instance, the carrier control function 30 may include a power imbalance function 32 for detecting the power imbalance, a carrier power division function 40, including a power remaining function 42 for determining an estimate of remaining power for uplink data transmission, and a power allocation function 44 for allocating the remaining power between the at least two uplink RF carriers 22, 24. The carrier control function 30 may also include a carrier data division function 50 including a carrier reliability function 52 for determining reliability of each of the at least two uplink RF carriers 22, 24, and a data priority function 54 for determining presence of high priority data for the uplink transmission and scheduling the high priority data on the one of the at least two uplink RF carriers 22, 24 having a higher reliability.

The power imbalance function 32 may include hardware and/or software code executable by a processor for determining a power imbalance between a first RF carrier and a second RF carrier in uplink transmissions. For example, the power imbalance function 32 may monitor a control channel such as a dedicated physical control channel (DPCCH) being transmitted over the at least two uplink RF carriers 22, 24 by the UE 12.

Carrier power division function 40 may include hardware and/or software code executable by a processor for determining an estimate of a remaining available transmit power after estimating the transmit power used by each of the dedicated physical control channels. For example, carrier power division function 40 may include subfunctions, such as power remaining function 42 for determining the estimate of remaining available transmit power, and power allocation function 44 for allocating, in response to determining the presence of the transmit power imbalance, an estimated remaining available transmit power to the at least two RF carriers 22, 24 based on both a size of data granted for uplink transmission on each RF carrier and on an effective power per bit on each RF carrier.

Carrier data division function 50 may include hardware and/or software code executable by a processor for determining a reliability value for each RF carrier based on a data error rate, where a higher reliability value corresponds with a lower data error rate. For example, carrier data division function 50 may include subfunctions, such as carrier reliability function 52 for determining the reliability value, and a data priority function 54 for identifying data to be transmitted as having a first priority value or second priority value, where data with the first priority value may be a higher priority than data with the second priority value.

Moreover, in an aspect, UE 12 may include a transceiver 60 for receiving and transmitting radio transmissions. For example, in an aspect, the transceiver 60 may be in communication with, or connected to, a radio frequency front end 61 defined by, for instance, one or more power amplifiers 63, one or more band specific filters 62, and one or more antennas 64. When a downlink signal is received by UE 12, such as a BLER report for example, antenna 64 converts radio waves to an electrical signal. Antenna switch 65 may be a duplex switch that may selectively operate to select either a transmit path or a receive path for the signal (e.g., to select a receive path in this example). Filters 62 perform frequency filtering on the signal to obtain the desired frequency band. Transceiver 60 may perform a downconversion of the received signal from the RF front end 61, and may split the signal into in-phase and quadrature (I and Q) components. Amplifiers 63 may include a first amplifier to boost the filtered signal initially received from the filters 62, and a second amplifer for boosting the I and Q components. The I and Q components may then be converted to a digital format and demodulated by the transceiver 60. The I and Q components of received signal leaving the transceiver 60 may be a baseband signal that may be then further processed by the at least one processor 20. For example, transceiver 60 may receive a block error rate (BLER) report transmitted by the network entity 14, which may be used by carrier reliability function 52 to determine a reliability of each of the at least two uplink RF carriers 22, 24. In an aspect, the transceiver 60 may be a component or function separate from the processor 20. Transceiver 60 may transmit uplink data on at least one RF carrier, such as on at least one of the at least two uplink RF carriers 22, 24. In an aspect, transceiver 60 may send data having a higher priority data over an RF carrier with a higher reliability value. Although transceiver 60 is shown as a separate component from the one or more processors 20, it should be understood that in some implementations transceiver 60 may be included as a part of the one or more processors 20.

Figure 2B:
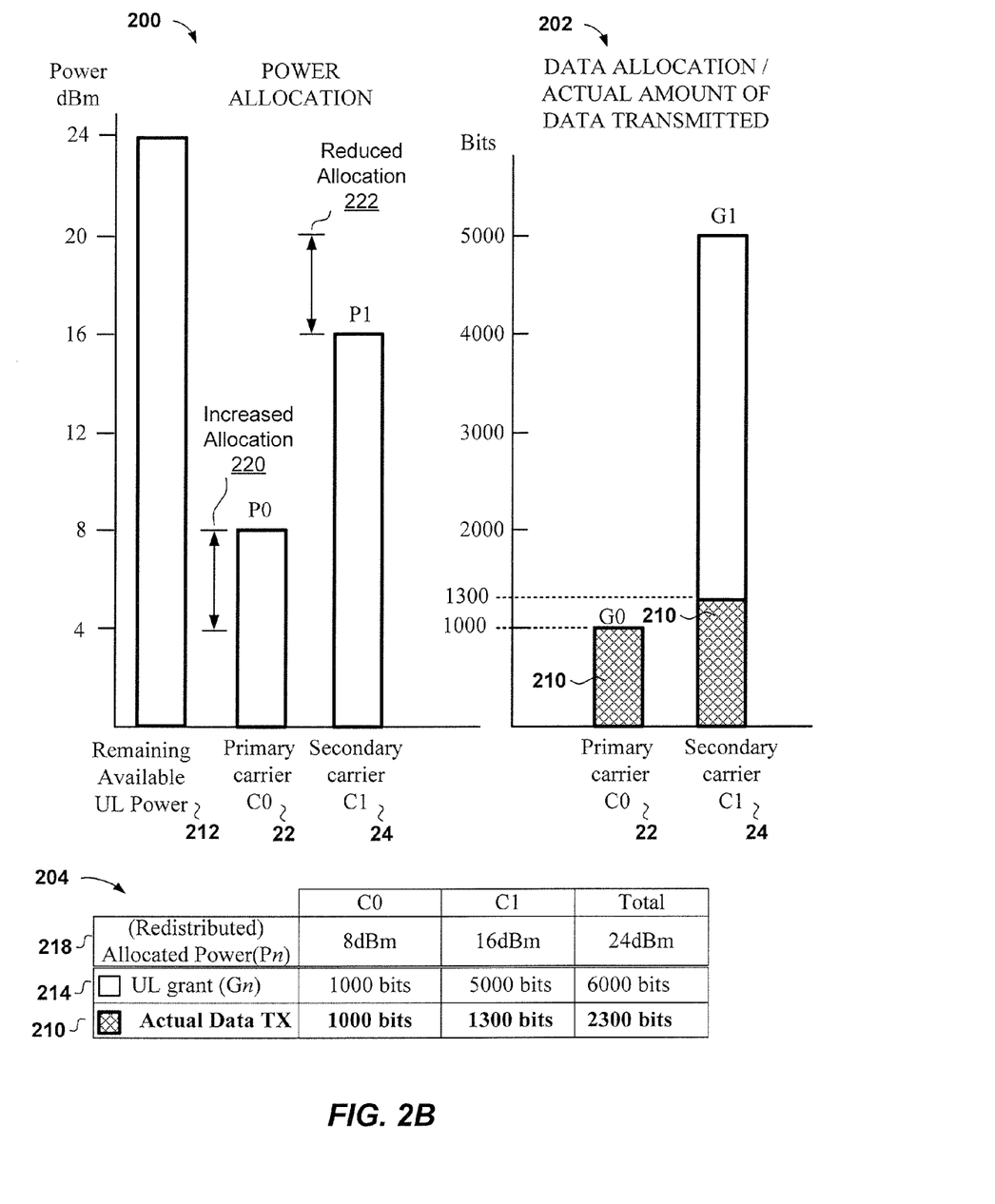
FIG. 2B is a graphical and summary table illustration of a redistributed power allocation, and corresponding data allocation and an actual amount of data transmitted, for each of two RF carriers, where the redistributed power allocations is based on both a size of the uplink data grant on each RF carrier and on an effective power per bit on each RF carrier, according to the present aspects.

Referring to FIGS. 2A and 2B, respective examples of power allocation and data allocation on two RF carriers before and after operation according to the aspects described herein are illustrated in respective power allocation graph 200, data allocation and actual amount of data transmitted graph 202, and summary table 204. In an operational aspect, a UE such as UE 12 (FIG. 1) may control transmit power of uplink data transmissions on multiple carriers having a transmit power imbalance. In an aspect, UE 12 may have two uplink RF carriers 22, 24 available for uplink transmission, such as a primary carrier C0 and a secondary carrier C1, and may monitor uplink transmissions on the RF carriers 22, 24 to determine that a power imbalance 206 between the carriers is present and exceeds a predetermined threshold 208. In response to the determination of the power imbalance 206 exceeding the predetermined threshold 208, UE 12 may then proceed to allocate the data and power on the uplink RF carriers 22, 24 in a manner to increase the amount of data transmitted 210 (e.g., total number of bits). The UE 12 is capable of determining available maximum transmit power and the transmit power required to send control signals on dedicated uplink control channels. The remaining available UL power 212 may then be allocated for uplink data transmission.

Turning to FIG. 2A, referring to power allocation graph 200 and summary table 204, UE 12 may estimate, for example, that there is 24 dBm remaining available UL power 212 for the data transmission on uplink RF carriers 22, 24, e.g., C0 and C1. From the network entity 14, and now referring to the data allocation graph 202 and summary table 204, UE 12 may receive an uplink data grant 214 of 6000 bits, with 5000 bits allocated to carrier C1 and 1000 bits allocated to C0.

Based on the uplink data grant 214 to each carrier, UE12 may allocate the 24 dBm estimated remaining available UL power 212, then adjust the split of allocated power 218 to each carrier based on the effective power per bit 216 on each of the RF carriers C0 and C1 (see FIG. 2B for the redistribution of allocated power 218). For example, as shown in FIG. 2A, the initial allocated power 218 for the carriers C0 and C1 may be proportionally based on the respective UL data grant 214, where power P0 to carrier C0 is (1000/6000)×24=4 dBm, and power P1 to carrier C1 is (5000/6000)×24=20 dBm.

Then, based on the amount of actual data transmitted 210 relative to the allocated power 218, the UE 12 may redistribute the allocated power 218. For example, if the UE 12 determines that carrier C0 has an effective power per bit 216 (e.g., for each carrier, allocated power 218 divided by amount of actual data transmitted 210) that is less than that of carrier C1 (e.g., carrier C0 is more power efficient than carrier C1 based on the allocated power and the amount of data transmitted), for example but not limited to meeting a predetermined threshold, then an adjustment to the allocated power 218 to each carrier may be performed to increase an amount of the allocated power 218 to the more power efficient carrier in order to increase the amount of data that may be transmitted.

For example, using a data allocation based on E-TFCI selection, the actual data transmitted 210 by RF carriers C0 and C1 may be 500 bits and 1500 bits, respectively, based on the initial allocated power 218 to each carrier that is proportional to the respective UL data grant 214, as shown in FIG. 2A. As such, in this example, the effective power per bit 216 for RF carrier C0 may then be determined by UE 12 as 4 dBm/500 bits=0.0008 dBm/bit. For RF carrier C1, the effective power per bit 216 may be determined by UE 12 as 20 dBm/1500 bits=0.013 dBm/bit. Thus, in this example, RF carrier C0 has a better power efficiency by consuming less power for each bit actually transmitted. Based on this determination, according to the present aspects, UE 12 may operate carrier control function 30 to redistribute allocated power 218 between the RF carriers C0 and C1 to increase an amount of allocated power 218 apportioned to the carrier having the better effective power per bit 216, as shown in FIG. 2B.

Referring to FIG. 2B, continuning with this example, since uplink RF carrier C0 was determined to have a better power efficiency (as illustrated in FIG. 2A), UE 12 operating carrier control function 30 may redistribute allocated power 218 by allocating a power P0 value of 8 dBm to carrier C0 (e.g., doubling the initial allocation of 4 dBm, as illustrated by increased allocation 220) and allocating the remaining 16 dBm as power P1 to uplink RF carrier C1 (e.g., decreasing the allocation, as illustrated by decreased allocation 222). In other words, for instance, UE 12 operating carrier control function 30 may redistribute allocated power 218 to each carrier C0 and C1 to provide the more power efficient carrier, C0 in this example, with a sufficient amount of power to maximize the amount of actual data transmitted 210. The result of the adjusted power allocation is that RF carrier C0 is enabled for greater data throughput with the increased power allocation, which may effectively provide an increased total amount of uplink data transmission across both carriers C0 and C1. For instance, as shown in data transmitted graph 202 and summary table 204 of FIG. 2B, using the redistributed power allocation for uplink transmission based on a subsequent E-TFCI selection based on UE 12 operating carrier control function 30, the actual data transmitted 210 may be 1300 bits on RF carrier C0 and 1000 bits on RF carrier C1, for an improved total transmission of 2300 bits as compared to the initial total data transmission of 2000 bits based on proportional uplink data grant alone (FIG. 2A).

Figure 3A:
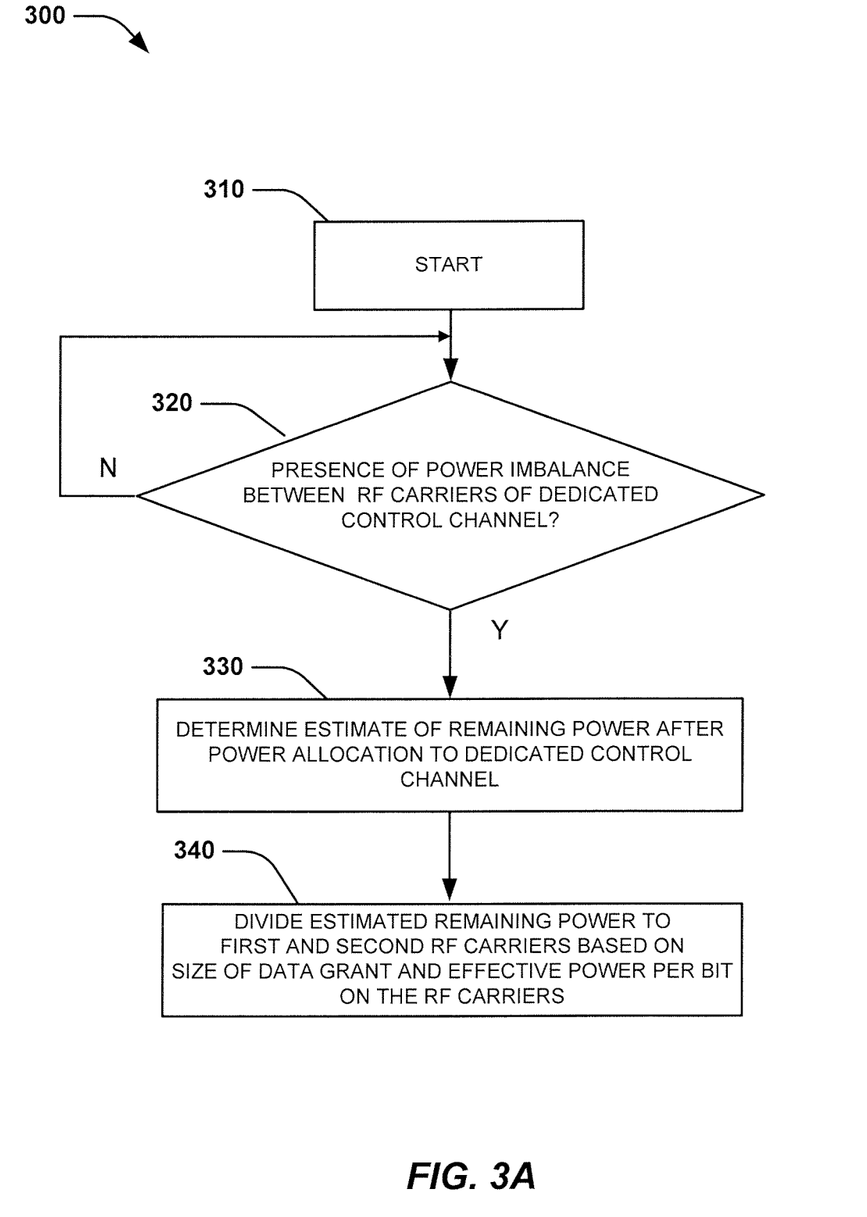
FIG. 3A is a flow diagram illustrating an example method of wireless communications for detecting a power imbalance between two RF carriers, and splitting transmit power based on granted data size per carrier and effective power per bit on the carriers.

Referring to FIG. 3A, in an operational aspect, a UE such as UE 12 (FIG. 1) may perform one aspect of a method 300 for controlling transmit power of uplink data transmissions on multiple carriers having a transmit power imbalance. While, for purposes of simplicity of explanation, the method 300 is shown and described as a series of acts, it is to be understood and appreciated that the method (and further methods related thereto) is/are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein. In an aspect, method 300 may be implemented by UE 12 and/or the one or more processors 20 executing carrier control function 30 and/or one or more of its sub-functions as described herein.

In an aspect, the method 300 may start at block 310, and at block 320, the method 300 may include determining presence of power imbalance on two or more RF carriers. For example, in an aspect, UE 12 and/or carrier control function 30 and/or power imbalance function 32 may monitor each uplink channel, such as each DPCCH corresponding to each of at least two uplink RF carriers 22 and 24, may determine a transmit power of each RF carrier for the uplink channel, may compute an imbalance between at least the first RF carrier 22 and a second RF carrier 24, and may compare the imbalance to a threshold value, such as, but not limited to, 2 dB for example, representing an amount of a power imbalance sufficient to trigger an adjustment to the division of remaining power between carriers, as described herein. If no imbalance is detected at block 320, then method 300 may return to start at block 310 and/or re-perform block 320 on a periodic basis.

If the presence of a power imbalance is detected in block 320, then in an aspect at block 330, the method 300 may include determining an estimate of remaining power available for uplink data transmission after power allocation to the dedicated physical control channel has been determined. For example, there may be a maximum power available for the uplink transmission, with some amount of transmit power used by the dedicated physical control channels, where the remaining power may be estimated by the difference. In an aspect, for example, UE 12 and/or carrier control function 30 and/or carrier power division function 40 and/or power remaining function 42 (FIG. 1) may estimate an amount of power available for scheduled E-DCH transmission as a difference between a maximum UE transmitter power and an estimate of current power for the dedicated physical control channel on each carrier. For instance, in an aspect, the estimate of the remaining available power remaining may be perfottned according to 3GPP Technical Specification 25.321 (Rel. 9), section 6.4.2.

In an aspect, at block 340, the method 300 may include allocating the estimated remaining power to the first RF carrier and the second RF carrier based on size of data granted for uplink transmission on each RF carrier and effective power per bit on each RF carrier. In an aspect, for example, UE 12 and/or carrier control function 30 and/or carrier power division function 40 and/or power allocation function 44 (FIG. 1) may determine a power split among the RF carriers based on the data grant, then adjust the power split to account for effective power per bit on each RF carrier. For example, if UE 12 is allowed a maximum power of 24 dBm, with an uplink data grant of 1000 bits on RF carrier C0 and 5000 bits on carrier RF carrier C1, power splitting for the RF carriers C0 and C1 may be initially based proportionally on the data grant, where power P0 to RF carrier C0 is 4 dBm, and power P1 to RF carrier C1 is 20 dBm as described and illustrated above in reference to FIG. 2A. If the UE 12 and/or carrier control function 30 and/or carrier power division function 40 and/or power allocation function 44 determines that RF carrier C0 has an effective power per bit that is less than that of RF carrier C1 (e.g., carrier C0 is more power efficient in transmitting data), for example but not limited to achieving a predetermined threshold, then an adjustment to the power split accordingly may result in changing the power allocation to the more power efficient carrier in order to increase the amount of data that may be transmitted as described and illustrated above in reference to FIG. 2B. The change in the power allocation may be implemented, for example, by applying a power efficiency factor to the power allocation equation so that power is allocated based on a combination of grant and power efficiency per carrier. For example, the grant values and power efficiency values may be normalized, and/or a weighting value may be applied to at least the power efficiency to bias the power allocation to the more efficient carrier. For instance, using the above example, the change in power allocation based on power efficiency may result in allocating 8 dBm to RF carrier C0 (e.g., doubling the initial allocation of 4 dBm) and allocating the remaining 16 dBm to RF carrier C1.

Figure 3B:
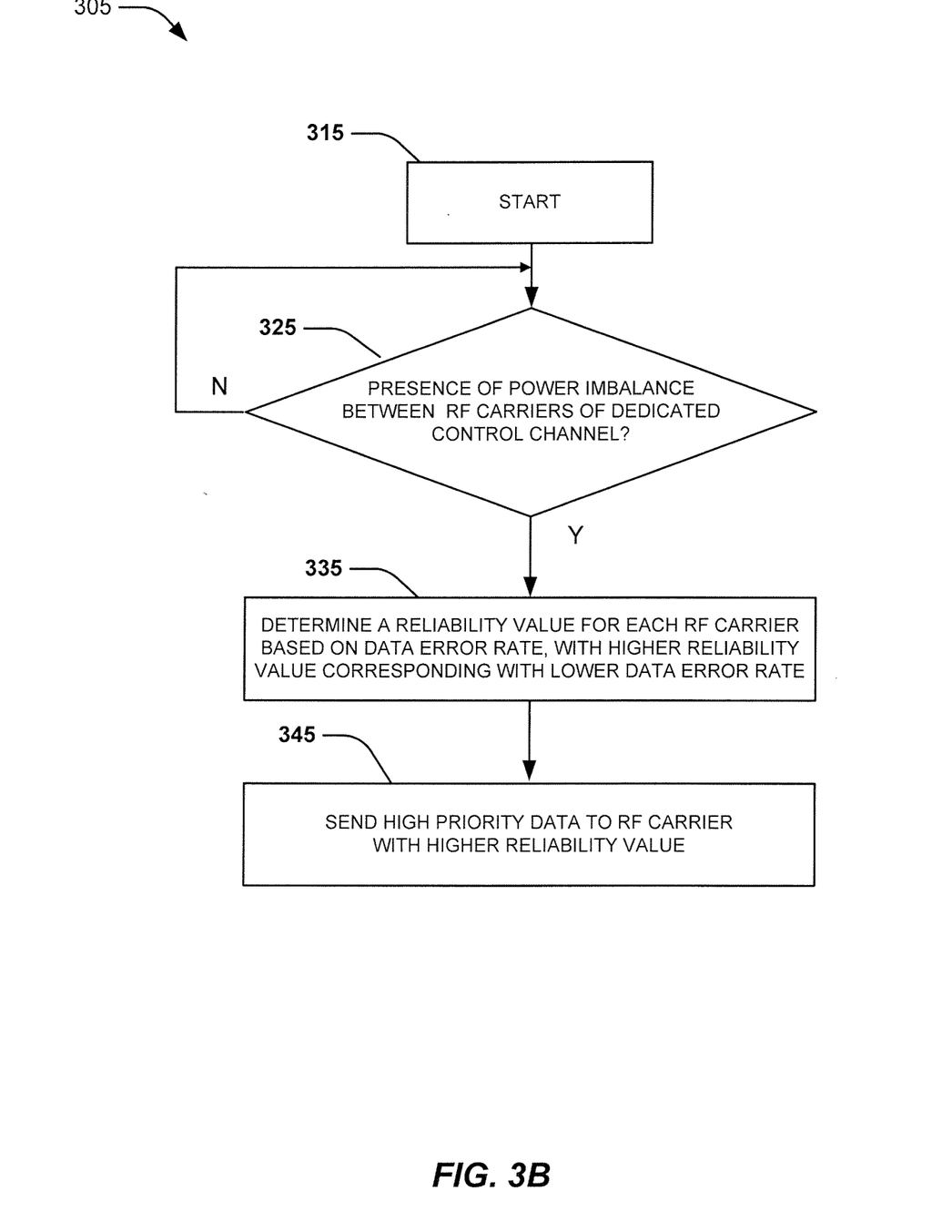
FIG. 3B is a flow diagram illustrating an example method of wireless communications for detecting a power imbalance between two RF carriers and sending priority bits on a more reliable carrier.

Referring to FIG. 3B, in an operational aspect, a UE such as UE 12 (FIG. 1) may perform one aspect of a method 305 for multiple carrier uplink transmission based on reliability of the RF carriers. In an aspect, method 305 may be implemented by UE 12 executing carrier control function 30 and/or one or more of its sub-functions as described herein. In an aspect, method 305 determines reliability of the RF carriers so that high priority data may be sent on a more reliable RF carrier.

In an aspect, the method 305 starts at block 315, and at block 325, the method 305 may include determining presence of a power imbalance between a first radio frequency (RF) carrier and a second RF carrier of respective dedicated physical control channels for uplink transmission. For example, in an aspect, UE 12 and/or carrier control function 30 and/or power imbalance function 32 may monitor each uplink channel, such as each DPCCH corresponding to the at least two uplink RF carriers 22 and 24, may determine a transmit power of each RF carrier for the uplink channel, may compute an imbalance between at least the first RF carrier 22 and a second RF carrier 24, and may compare the imbalance to a threshold value, such as 2 dB for example, for establishing presence of a power imbalance. If no power imbalance is detected at block 325, then method 305 may return to start at block 315 and/or repeat block 325 on a periodic basis.

If the presence of a power imbalance is detected in block 325, then in an aspect at block 335, the method 305 may include determining a reliability value for each RF carrier based on a data error rate, wherein a higher reliability value corresponds with a lower data error rate. In an aspect, for example, UE 12 and/or carrier data division function 50 and/or carrier reliability function 52 (FIG. 1) may determine a reliability value for each RF carrier based on a data error rate (e.g., bit error rate (BER) or block error rate (BLER)). For example, an RF carrier C0 may have a lower BER than RF carrier C1, and a relatively higher reliability value may be assigned to carrier C0 than carrier C1 accordingly. In another aspect, a relatively higher reliability value may be based on a relatively lower power requirement for a particular RF carrier, indicating favorable channel conditions.

In an aspect, at block 345, method 305 may include sending at least a portion of the high priority data to the RF carrier with a higher reliability value. In an aspect, for example, UE 12 and/or carrier control function 30 and/or carrier data division function 50 and/or data priority function 54 (FIG. 1) may determine from a transmit data buffer (e.g., which may include, but is not limited to, a layer 2 transmit buffer) that there is data identified as high priority data and other data with a relatively lower priority or no priority. In an aspect, for example, the priority of the data may be identified based on a logical channel priority status. In any case, some or all of the high priority data may be sent on the one of the at least two uplink RF carriers 22, 24 having the relatively higher reliability value as determined in block 335. In another aspect, for example, UE 12 and/or carrier control function 30 and/or carrier data division function 50 and/or data priority function 54 (FIG. 1) may send redundant high priority data concurrently on the at least two uplink RF carriers 22, 24. Herein, the term "concurrently" means the same data is intended to be transmitted on both carriers at approximately the same time (within a few seconds). This aspect allows for increased reliability in the transmitted data reaching the destination, as the same data is sent over two different carriers. In another aspect, less data or no data may be allocated and sent on the relatively lower reliability RF carrier.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112 (f), unless the element is expressly recited using the phrase "means for" or, in the case of a method claim, the element is recited using the phrase "step for."

What is claimed is:

1. A method of a user equipment controlling transmit power of multiple carrier uplink transmissions for wireless communications, comprising:
   determining presence of a transmit power imbalance between a first radio frequency (RF) carrier and a second RF carrier of respective dedicated physical control channels for uplink transmission;
   determining an estimate of a remaining available transmit power after estimating the transmit power used by each of the dedicated physical control channels; and
   allocating, in response to determining presence of the transmit power imbalance, an estimated remaining available transmit power to the first RF carrier and the second RF carrier respectively based on both a size of data granted for uplink transmission on each RF carrier and on an effective power per bit on each RF carrier.

2. The method of claim 1, further comprising:
   determining that the first RF carrier has an effective power per bit value that is less than that of the second RF carrier, and in response thereto, allocating more available transmit power to the first RF carrier than to the second RF carrier and allowing an increased amount of data transmission on the first RF carrier.

3. The method of claim 2, further comprising:
   normalizing data grant values and power efficiency values; and
   applying a weighting value to at least the power efficiency to bias the allocating of remaining available transmit power to the first RF carrier.

4. A user equipment (UE) for scheduling multiple carrier uplink data transmissions for wireless communications, comprising: a processor; and a memory coupled to the processor, wherein the memory includes instructions executable by the processor to:
   determine presence of a transmit power imbalance between a first radio frequency (RF) carrier and a second RF carrier of respective dedicated physical control channels for uplink transmission;
   determine an estimate of a remaining available transmit power after estimating the transmit power used by each of the dedicated physical control channels; and to allocate, in response to determining presence of the transmit power imbalance, remaining available transmit power to the first RF carrier and the second RF carrier respectively based on both a size of data granted for uplink transmission on each RF carrier and on an effective power per bit on each RF carrier.

5. The UE of claim 4, wherein the instructions are further executable by the processor to:
   determine that the first RF carrier has an effective power per bit value that is less than that of the second RF carrier, and in response thereto, allocate more available transmit power to the first RF carrier than to the second RF carrier and allowing an increased amount of data transmission on the first RF carrier.

6. The UE of claim 5, wherein the instructions are further executable by the processor to normalize data grant values and power efficiency values; and apply a weighting value to at least the power efficiency to bias the allocating of remaining available transmit power to the first RF carrier.

7. An apparatus of a user equipment controlling transmit power of multiple carrier uplink transmissions for wireless communications, comprising:
   means for determining presence of a transmit power imbalance between a first radio frequency (RF) carrier and a second RF carrier of respective dedicated physical control channels for uplink transmission;
   means for determining an estimate of a remaining available transmit power after estimating the transmit power used by each of the dedicated physical control channels; and
   means for allocating, in response to determining presence of the transmit power imbalance, an estimated remaining available transmit power to the first RF carrier and the second RF carrier respectively based on both a size of data granted for uplink transmission on each RF carrier and on an effective power per bit on each RF carrier.

8. The apparatus of claim 7, further comprising:
   means for determining that the first RF carrier has an effective power per bit value that is less than that of the second RF carrier, and in response thereto, means for allocating more available transmit power to the first RF carrier than to the second RF carrier and allowing an increased amount of data transmission on the first RF carrier.

9. The apparatus of claim 8, further comprising:
   means for normalizing data grant values and power efficiency values; and means for applying a weighting value to at least the power efficiency to bias the allocating of remaining available transmit power to the first RF carrier.

* * * * *